United States Patent
Nagaso

(10) Patent No.: US 7,151,610 B2
(45) Date of Patent: Dec. 19, 2006

(54) IMAGE FORMING DEVICE CAPABLE OF SUSPENDING A CURRENT JOB AND EXECUTING AN INTERRUPTING JOB

(75) Inventor: Tadashi Nagaso, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 736 days.

(21) Appl. No.: 09/839,947

(22) Filed: Apr. 20, 2001

(65) Prior Publication Data

US 2002/0012135 A1   Jan. 31, 2002

(30) Foreign Application Priority Data

May 22, 2000   (JP)   ............................. 2000-150061

(51) Int. Cl.
  *G06F 15/00*   (2006.01)
(52) U.S. Cl. ...................... 358/1.13; 358/1.1
(58) Field of Classification Search ................ 358/1.1, 358/1.5, 1.12, 1.13, 1.14, 1.15, 468, 296; 399/19
  See application file for complete search history.

(56) References Cited

U.S. PATENT DOCUMENTS

| | | | | |
|---|---|---|---|---|
| 4,711,556 A | * | 12/1987 | Abuyama ..................... | 399/87 |
| 5,206,735 A | * | 4/1993 | Gauronski et al. .......... | 358/296 |
| 5,812,901 A | * | 9/1998 | Morikawa ..................... | 399/19 |
| 6,035,156 A | * | 3/2000 | Okamoto et al. ............ | 399/82 |
| 6,125,249 A | * | 9/2000 | Ootsuka et al. ............... | 399/87 |
| 6,785,727 B1 | * | 8/2004 | Yamazaki ..................... | 709/229 |

FOREIGN PATENT DOCUMENTS

| | | |
|---|---|---|
| JP | 56-001068 | 1/1981 |
| JP | 58-174966 | 10/1983 |
| JP | 63-087433 | 4/1988 |
| JP | 05-000755 | 1/1993 |
| JP | 5-77938 | 3/1993 |
| JP | 6-344642 | 12/1994 |
| JP | 8-18719 | 1/1996 |
| JP | 8-324073 | 12/1996 |
| JP | 11-168590 | 6/1999 |

OTHER PUBLICATIONS

Japanese Patent Office Action.

* cited by examiner

*Primary Examiner*—Gabriel Garcia
(74) *Attorney, Agent, or Firm*—David G. Conlin; David A. Tucker; Edwards Angell Palmer & Dodge LLP

(57) ABSTRACT

On receipt of image data printable on A4-sized paper, the device provided with A4-, A3- and B5-sized paper feeding trays 1, 2 and 3 carries out printing the data on A4-sized paper feed from the tray 1 (as shown in FIG. 2(A)). When an interrupt request takes place to temporarily suspend a current printing job and carry out a copying job using the B5-sized paper feeding tray, the device accepts the interrupt because of no need for use of the A4-sized paper feeding tray, carries out the copying job by using the tray 3 and then resumes the suspended job by using the tray 1 (as shown in FIG. 2(B)). If an interrupting copying job requires use of the A4-sized paper feeding tray, the device neglects the interrupt and continues the current printing job (as shown in FIG. 2(C)).

7 Claims, 9 Drawing Sheets

FIG 2
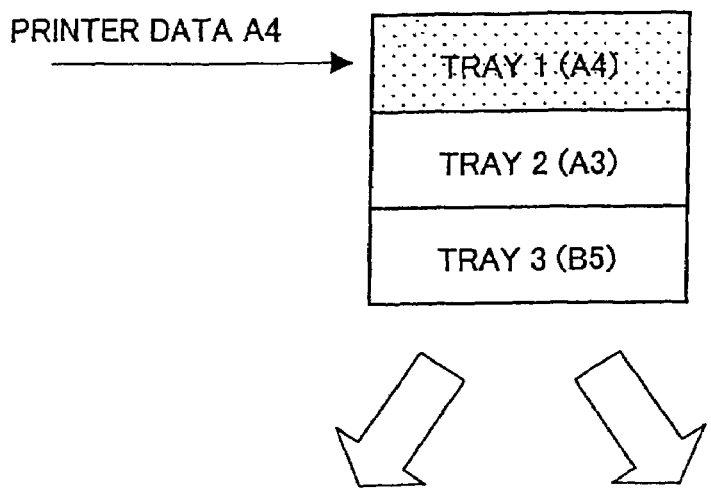
(A)
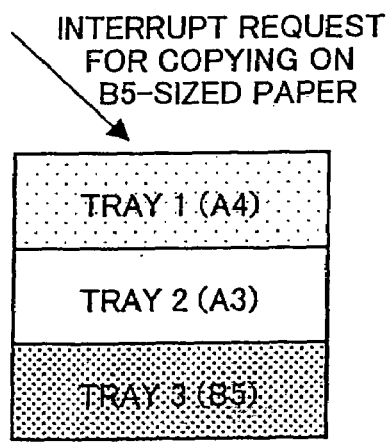
(B)
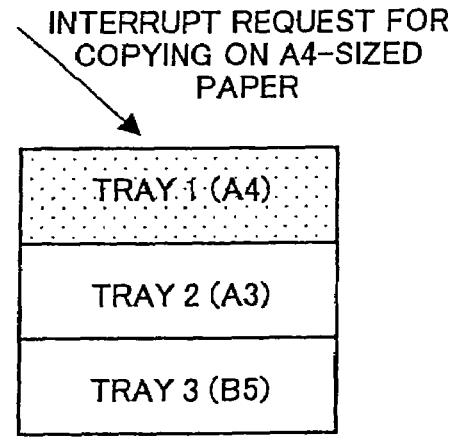
(C)

IMAGE FORMING DEVICE CAPABLE OF SUSPENDING A CURRENT JOB AND EXECUTING AN INTERRUPTING JOB

BACKGROUND OF THE INVENTION

The present invention relates to an image forming device for processing image data, which is provided with multiple functions such as of a printer, a copier, a facsimile, a scanner and so on. More specifically, the invention relates to an image forming device capable of temporarily suspending a current job on receipt of an interrupt request and performing the requested job following the interrupt, ensuring that the job suspended by the interrupt may be successfully resumed and completed by printing all image data on paper without causing an error signal "no paper" for the job.

In the art, there are known image forming devices capable of temporarily suspending a current job by an interrupt request and performing the requested job following the interrupt, which devices are for example as follows:

Japanese Laid-Open Patent Publication No. 8-18719 discloses a printer device with a facsimile transmitter, the device is capable of receiving facsimile information and also printing data outputted from a personal computer and which has a mode settable to prohibit an interrupt from a facsimile transmission in case of printing urgent and important online data from a personal computer.

Japanese Laid-Open Patent Publication No. 11-168590 discloses a digital copying machine capable of printing data inputted from its scanner portion as well as data inputted from any external unit connected thereto. The machine can check the necessity of interrupting a current job to perform another job on the basis of its emergency, so that a current emergent printing job or printing only one page may not be put off against a user's will.

In the above examples, it is not ensured that a temporarily interrupted or suspended job can be successfully finished after the end of the interruption. Namely, such suspended or interrupted job may be suspended again for example with an error signal "no paper" as a result of consumption of paper by the interrupting job. In the other words, some users may accept, an interrupt request for another printing job to postpone the current printing job on condition that the current printing job is resumed later and completed without the occurrence of an error signal "no paper" due to the consumption of the paper by the interrupting job.

SUMMARY OF THE INVENTION

An object of the present invention is to provide an image forming device capable of giving priority of using a designated paper feeding tray to an interrupted or suspended printing job over an interrupting job, so that the interrupted or suspended job may be resumed and successfully completed without causing an error signal "no paper" due to consumption of paper by the interrupting job.

Another object of the present invention is to provide an image forming device that is provided with a sensor for detecting the number of paper sheets remaining in each paper feeding tray and capable of correctly judging whether the resumed printing job may be suspended again by an error signal representing "no paper".

Another object of the present invention is to provide an image forming device having a function for suspending the current job and executing an interrupting job, which is provided with a judging portion for deciding whether the interrupting job may be permitted to use a designated paper feeding tray when the current job and the interrupting job require the same paper feeding tray.

Another object of the present invention is to provide an image forming device, wherein the judging portion does not permit an interrupting job to print data on paper if the interrupting job selects the same paper feeding tray that is selected by the current printing job but permits the interrupting job to print data on paper when the paper feeding tray selected by the interrupting job is different from the paper feeding tray used by the current job.

Another object of the present invention is to provide an image forming device, wherein a judging portion instructs an interrupting job to select a different paper-feeding tray if the tray designated by the interrupting job corresponds to the tray selected by the interrupted job and permits the interrupting job when it selects a paper feeding tray different from the tray being used by the interrupted job.

A further object of the present invention is to provide an image forming device wherein each paper feeding tray is provided with a detector for detecting each number of remaining paper sheets therein and a judging portion which calculates a total number of paper sheets needed by both an interrupted job and an interrupting job requested by an interrupt and accepts the interrupt to execute the requested job when the total number of paper sheets is less than a number of paper sheets remaining in the selected paper-feeding tray and dose not accept the interrupt when the total number of paper sheets is more than the number of paper sheets remaining in the selected tray.

A still further object of the present invention is to provide an image forming device in which each paper feeding tray is provided with a detector for detecting each number of paper sheets remaining therein and the judging portion determines a total number of paper sheets needed by both an interrupted job and an interrupting job and permits the interrupting job when the total number of needed paper-sheets is less than the number of paper sheets remaining in the paper feeding tray or instructs the interrupting job to select a different paper feeding tray when the total number of paper sheets is more than the number of paper sheet remaining in the paper feeding tray and permits the interrupting job to be executed when the interrupting job selects a different paper feeding tray.

Another object of the present invention is to provide an image forming device wherein a judging portion prohibits the use of a paper-feeding tray selected by an interrupted job while performing the interrupting job.

A further object of the present invention is to provide an image forming device wherein each paper feeding tray is provided with a locking device and the tray selected by the interrupted job (current job) is locked not to feed a paper sheet from there.

A still further object of the present invention is to provide an image forming device wherein function of a judging portion is selectable.

BRIEF DESCRIPTION OF THE DRAWINGS

FIG. 2 is a view for explaining a first exemplified operation of a multifunction device comprising a printer and a copier.

PREFERRED EMBODIMENTS OF THE PRESENT INVENTION

Referring to FIGS. 1 to 10, preferred embodiments of the present invention will be below described.

Figure 10:
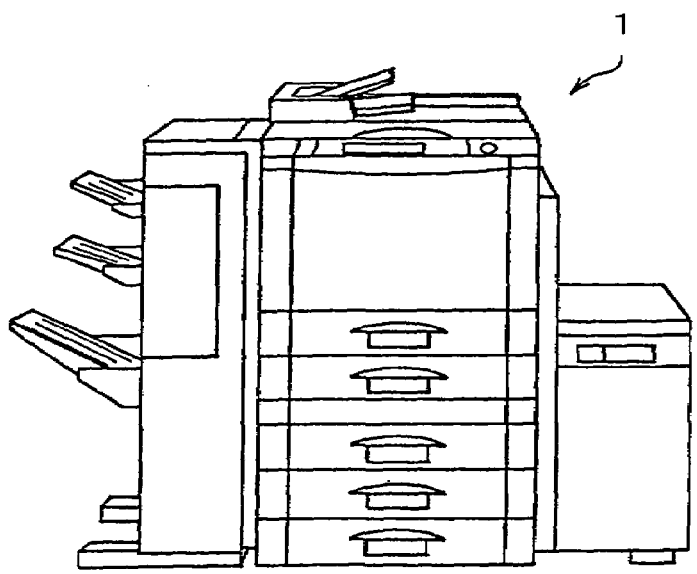
FIG. 10 is a schematic view of an appearance of a multifunctional image forming device embodying the present invention.

FIG. 10 schematically illustrates a multifunctional image processing device embodying the present invention, which includes function such as a printer, a facsimile transmitter-receiver and a scanner to compose a multifunctional image processing device 11 provided with a plurality of paper feeding trays for containing different formats of paper-sheets respectively to be selectively used for printing data thereon.

Figure 1:
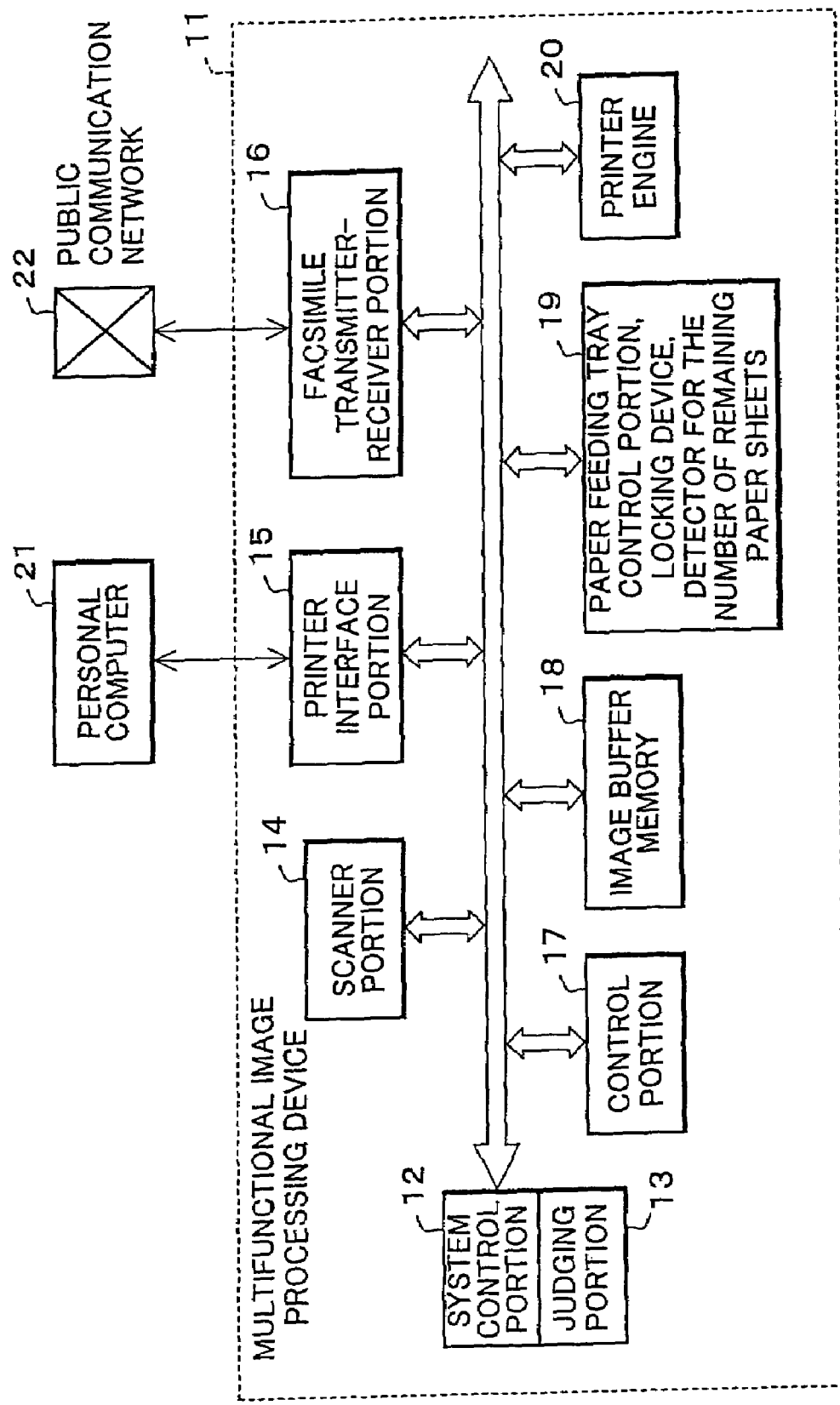
FIG. 1 is a system construction block diagram of a multifunctional image-forming device according to an aspect of the present invention.

FIG. 1 is a block diagram illustrating a system construction of the multifunctional image-processing device 11.

A scanner portion 14 of the multifunctional image-processing device 11 reads an original image by sequentially scanning lines on the original, converts the data into electric signals and outputs the generated signals.

A printer interface portion 15 is connected to an external information processing apparatus such as a personal computer 21 to input printing information into the multifunctional image processing device 11 that is used as a printer in this case.

A facsimile receiving/transmitting portion 16 is connected to a public communication network 22 to receive and transmit facsimile image. The use of this portion enables the multifunctional image processing device 11 to work as a facsimile apparatus.

A control portion 17 includes instruction input portion for inputting instructions to the multifunctional image processing device 11 and a display for indicating a status of the device 11.

An image buffer memory portion 18 is used for temporarily storing image data received or transmittable by the facsimile receiving/transmitting portion or image data to be printed to produce a plurality of copies.

A printer engine 20 prints on recording paper an image read by the scanning portion 14, information input through the printer interface portion 15 and image data received by the facsimile receiving/transmitting portion 16.

The control portion 17 allows a user to select one or more paper feeding trays and input a various kinds of settings into the multifunctional image-processing device 11.

A paper feeding tray control portion 19 is used for controlling, based on the user's selection and settings, the feeding of paper from a designated tray, recognition of a number of paper sheets remaining in the tray and locking of the tray not to feed unnecessary paper sheets from there.

A system control portion 12 is used in combination with a judging portion 13 to control the operation of the present system. The system control portion 12 comprises a logical operation portion (CPU), a ROM for storing a control program and a RAM for storing control parameters.

The operation of the multifunctional image processing device 11 according to the present invention will be by way of example described as follows:

FIG. 2 depicts the first example of operation of the multifunctional image processing device having a printer function and a copier function, which operates as follows:

The multifunctional image processing device 11 has three paper feeding trays: a tray 1 is used for paper sheets of A4 size, a tray 2 for paper sheets of A3 size and a tray 3 for paper sheets of B5 size. On receipt of transmitted data to be printed on A4-sized paper sheets, it operates to print the data on a A4-sized paper sheet supplied from the tray 1 as shown in FIG. 2(A). If an interrupt requests for the execution of a copying job for copying data on B5-size paper sheets, the device gives permission to interrupt current copying job since it does not use the tray 1 and carries out first the interrupting job by feeding B5-sized paper sheets from the tray 3, then carries out the postponed printing job by feeding A4-sized paper sheets from the tray 1 as shown in FIG. 2(B). On receipt of an interrupt requesting copying data on A4-size paper sheets, the device nullifies the interrupt since the job uses the tray 1 and continues the printing job as shown in FIG. 2(C).

The exemplified operation 1 of the device is described below with reference to a flowchart of FIG. 5.

At the beginning of processing image data for the first job (hereinafter referred to as job A), the multifunctional image processing device analyzes the data for the job A to form an image to be printed (Step S1).

On completion of forming the printable image, the device 11 starts the printing process by using the tray designated by the job A (Step S2). While the device 11 periodically checks whether an interrupt takes place (Step S3), it continues printing job A (Step S4). In this case, the job A is not interrupted but completed to produce all requested prints (Step S5).

If an interrupt request for an interrupting job (hereinafter referred to as job B) is received in Step S3, the device 11 examines whether a paper feeding tray to be used for the job B corresponds to the tray being used for the job A (Step S6), then, if so, the device 11 neglects the interrupt request and continues the job A. If the tray to be used for the job B is different from the tray being used for the job A, then the job A is suspended and the job B is carried out following the interrupt (Step S7).

Figure 5:
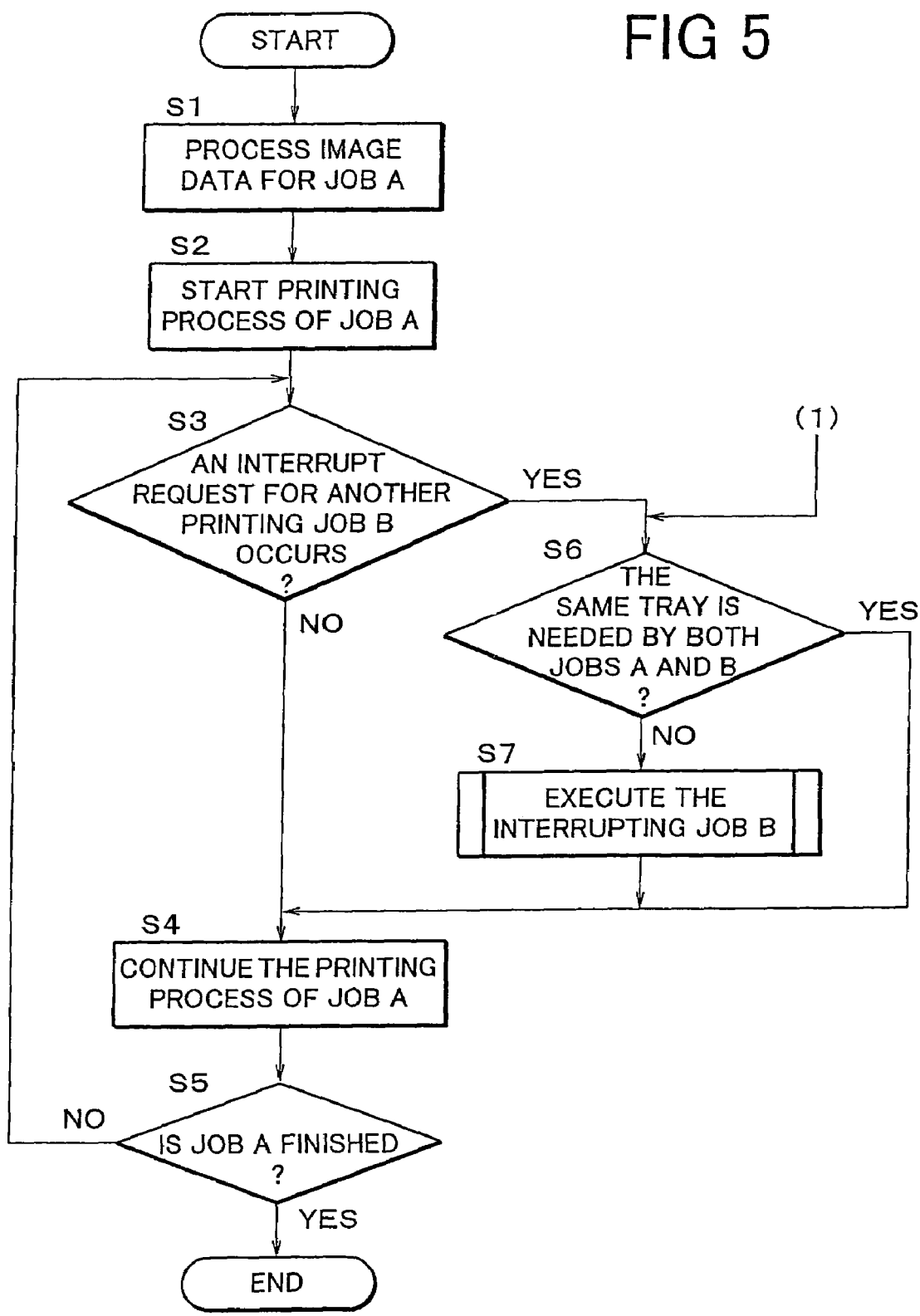
FIG. 5 is a flowchart illustrating the first exemplified operation of the device.
Figure 6:
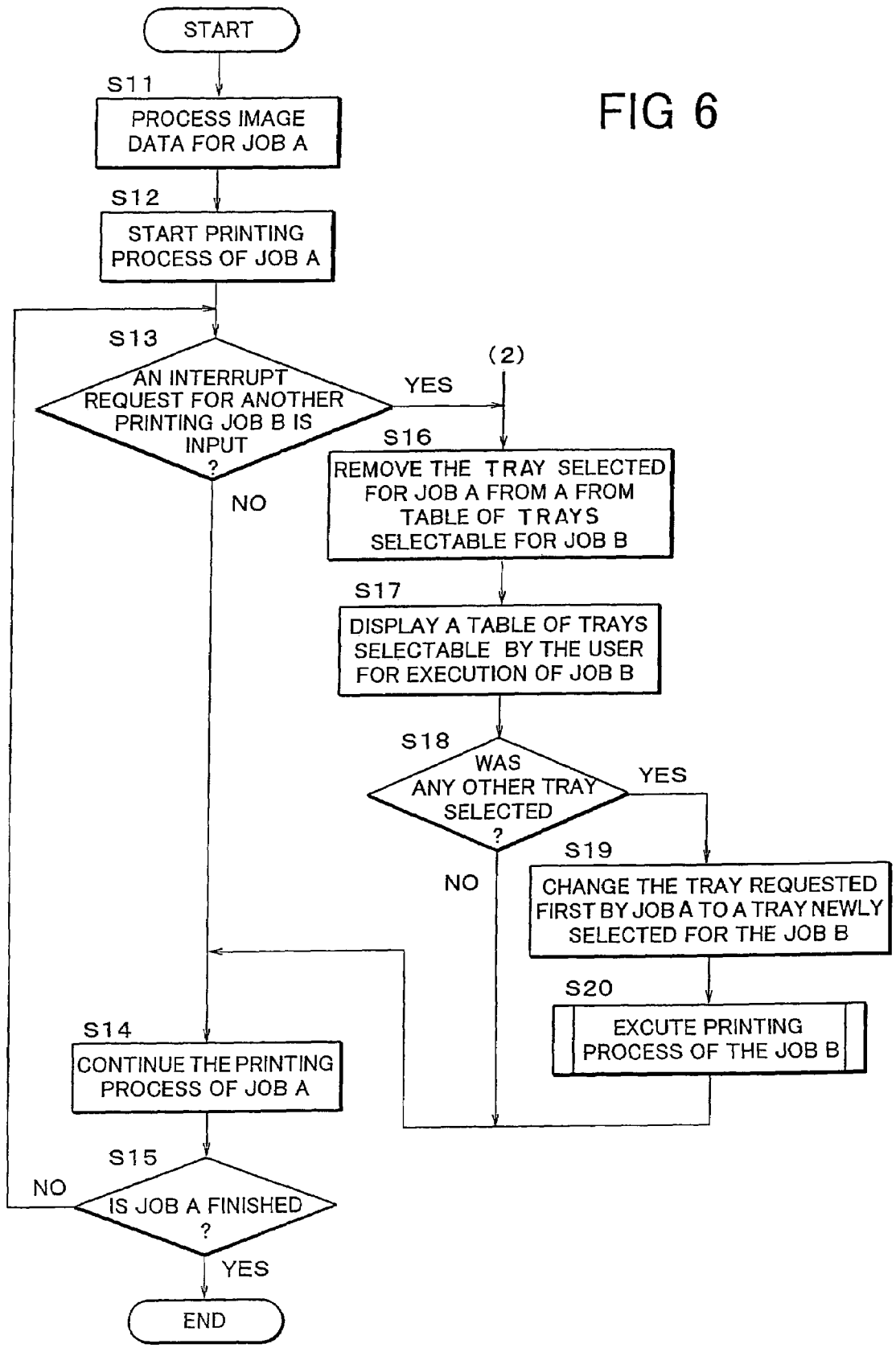
FIG. 6 is a flowchart illustrating the second exemplified operation of the device.
Figure 7:
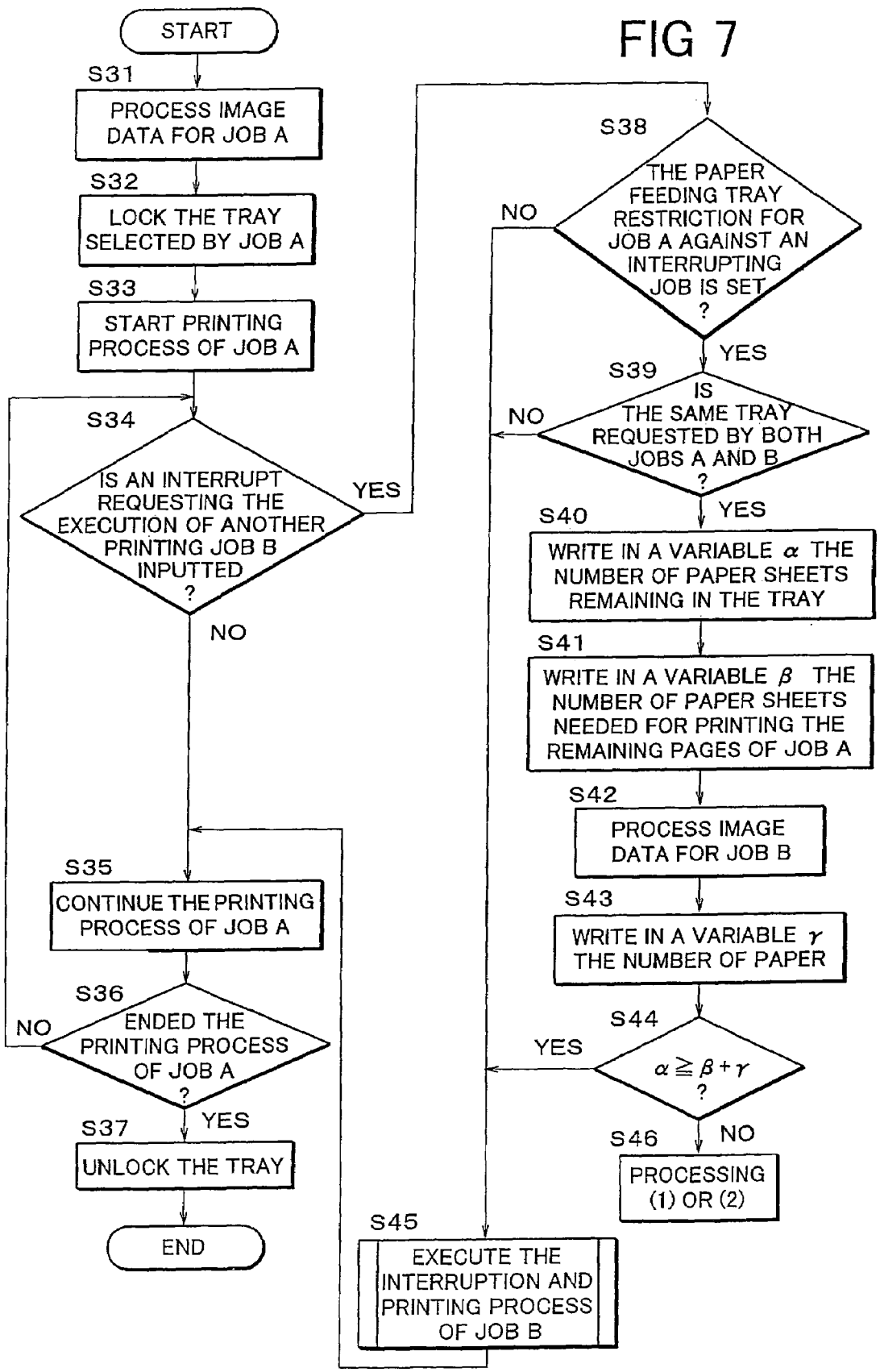
FIG. 7 is a flowchart illustrating the third exemplified operation of the device.
Figure 8:
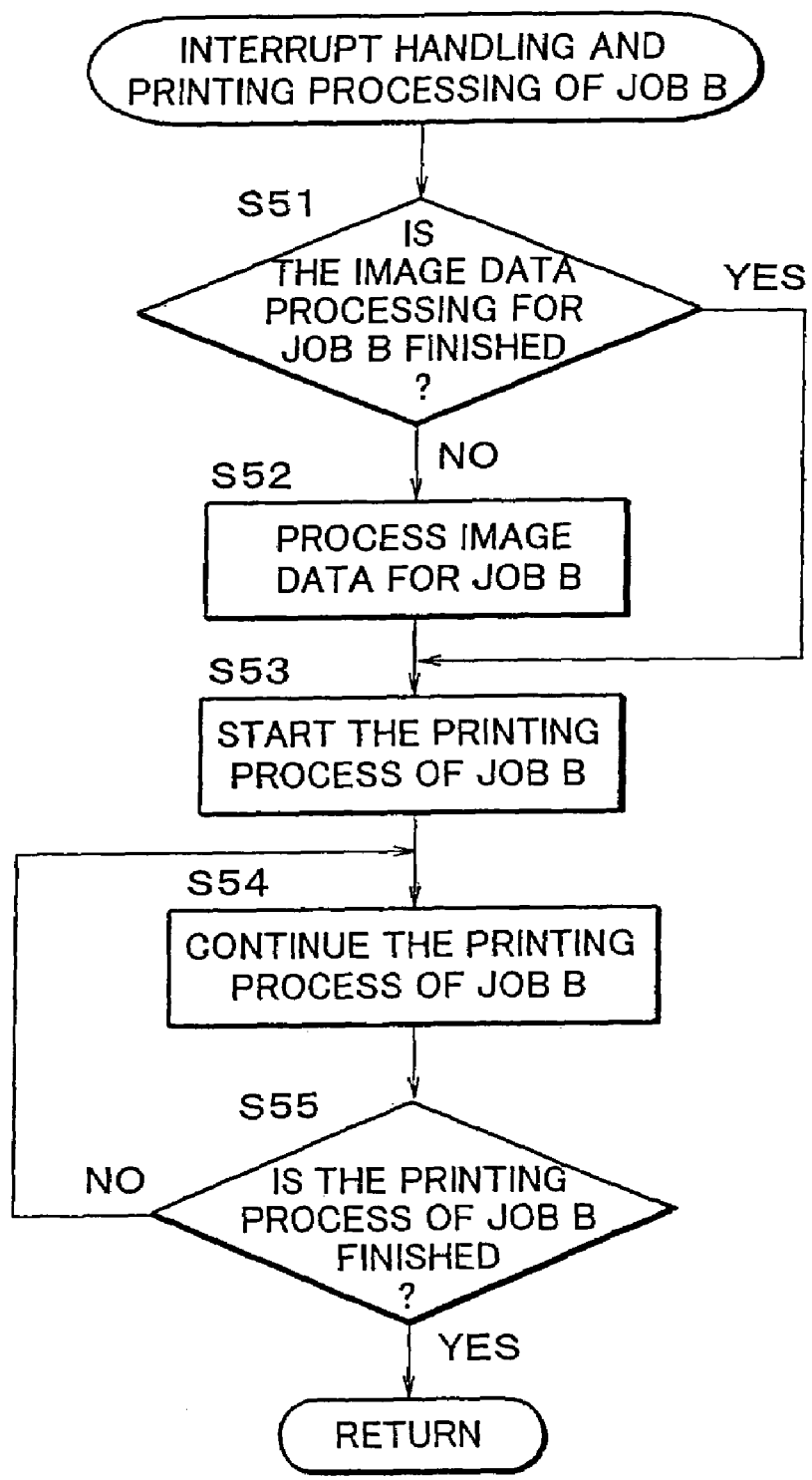
FIG. 8 is a flowchart illustrating a subroutine that carries out the printing job requested by an interrupt.

FIG. 8 is a flowchart depicting the printing process in Step S7 of FIG. 5, Step S20 of FIG. 6 and Step S45 of FIG. 7.

An interrupting printing job (job B) starts with Step S51 whereat a check is made whether processing image data for the job B is completed. If the processing for the job B was not finished, then it is carried out (Step S52), and then a printing process begins (Step S53). If the image data processing was completed in Step S51, the printing process of the job B immediately begins (Step S53).

The printing process continues until the last page of the images prepared by the image data processing step is printed (Step S54). On completion of printing the last page, the interrupting printing process ends (Step S55).

Figure 3:
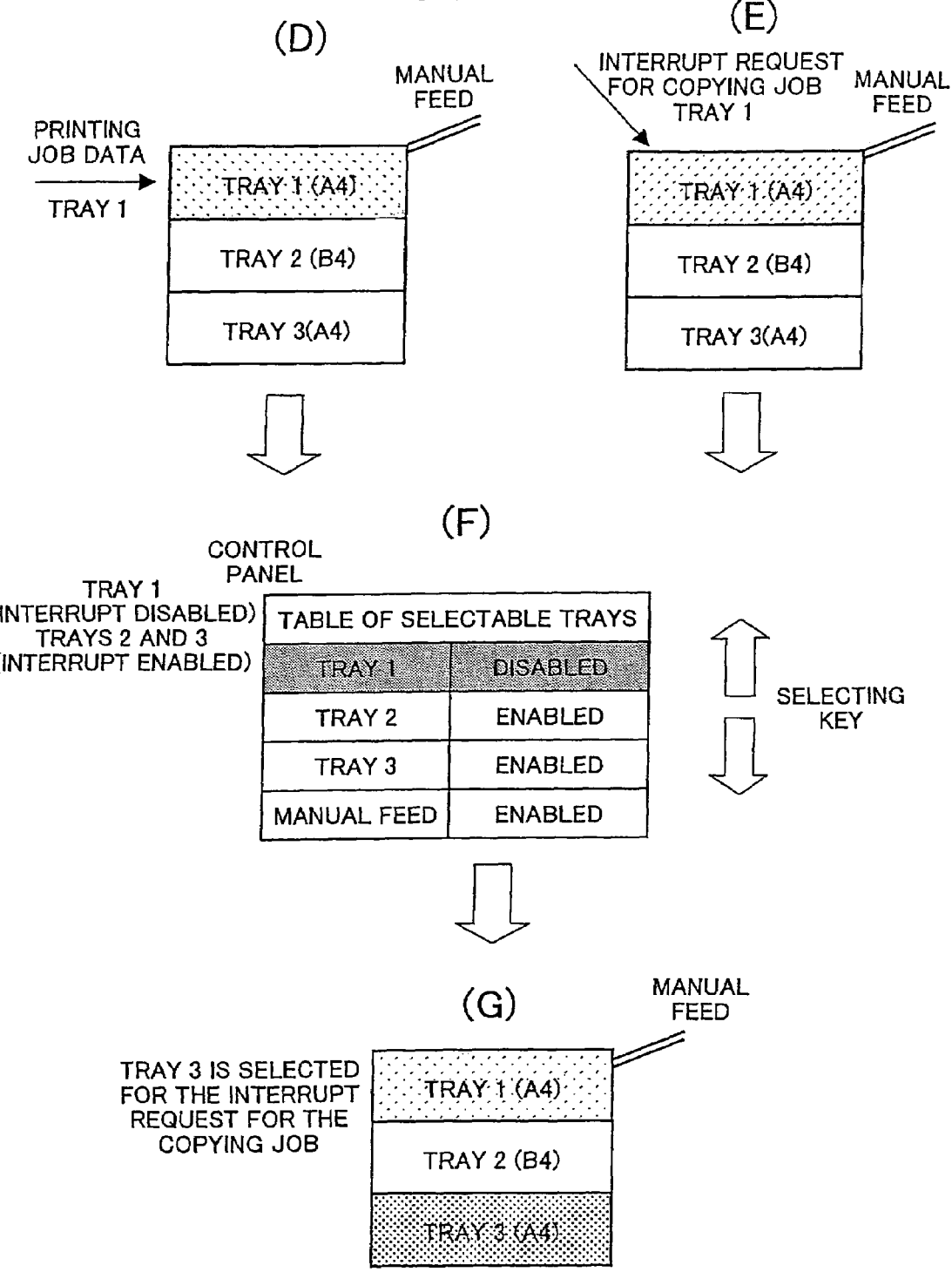
FIG. 3 is a view for explaining a second exemplified operation of a multifunction device comprising a printer and a copier.

FIG. 3 depicts the second example of operation of the combination device having a printer function and a copier function, which operates as follows:

The multifunctional image processing device 11 has three paper feeding trays: a tray 1 is used for paper sheets of A4 size, a tray 2 for paper sheets of B4 size and a tray 3 for paper sheets of A4 size. On receipt of data to be printed on A4-sized paper sheets, the device 11 operates to print the received data on A4-sized paper sheets supplied from the tray 1 as shown in FIG. 3(D). On arrival of an interrupt request for a job for copying data on A4-size paper sheets as shown in FIG. 3(E), the device 11 displays a table of selectable trays on a display screen of the control panel and a user is instructed to select another tray by using a selection key since the tray for A4-sized paper sheets has been selected for the printing job as shown in FIG. 3(F). In the second example, the tray 3 is selected and the interrupting copying job is carried out. If the user did not select any tray other than the tray 1 for A4-sized paper sheets, the device 11 neglects the interrupt request and continues the printing job as shown in FIG. 2(C).

The exemplified operation 2 of the device 11 is described below with reference to a flowchart of FIG. 6.

To begin processing image data for a first job (job A), the device 11 analyzes data for the job A to form an image to be printed (Step S11).

On completion of forming the printable image, the device 11 starts printing process by feeding a paper sheet from the tray designated by the job A (Step S12). While the device 11 periodically checks whether an interrupt takes place (Step S13), it continues the printing job A (Step S14). In this case, the job A is not interrupted but completed to produce all requested prints (Step S15).

If an interrupting job (job B) takes place in Step S13, the device 11 prepares a list of trays other than the tray being used by the printing job (A) (Step S16) and displays it on the display screen of the control panel (Step S17), and the user is requested to select one of the available trays by using the input/display functions.

If no tray was selected by the user (Step S18), the device 11 suspends the interrupt and continues the printing job A (Step S14). If any other tray for paper sheets of a different size was selected by the user, the device changes the tray for the job B to the newly selected tray (Step S19) and carries out the printing process following the interrupt as shown in FIG. 8 (Step S19).

Figure 4:
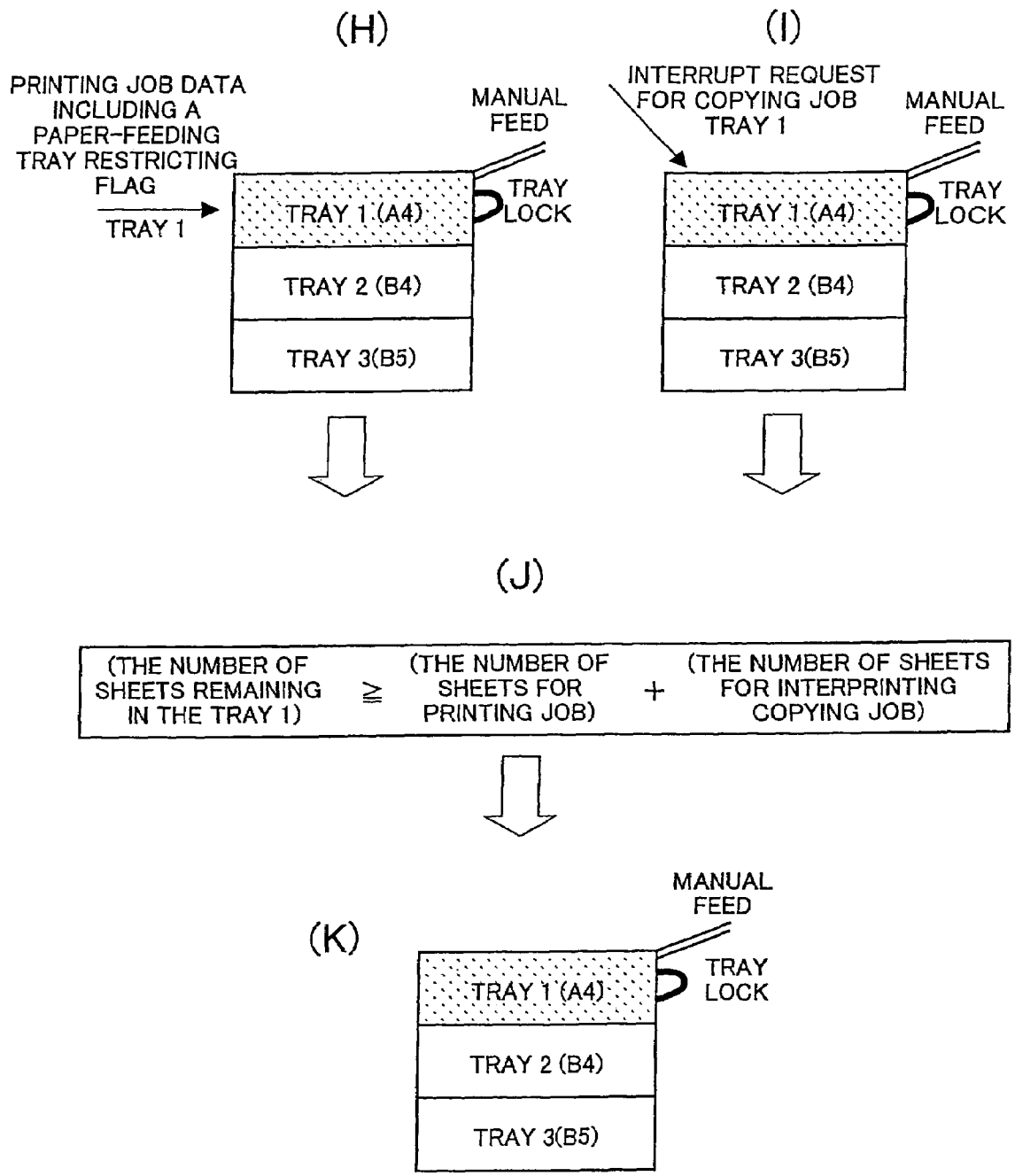
FIG. 4 is a view for explaining a third exemplified operation of a multifunction device comprising a printer and a copier.

FIG. 4 depicts the third exemplified operation of the multifunctional image processing device 11 having a printer function and a copier function, which operates as follows:

The device 11 has three paper feeding trays: a tray 1 is used for paper sheets of A4 size, a tray 2 for paper sheets of B4 size and a tray 3 for paper sheets of B5 size. On receipt of a paper feeding restriction flag 104 shown in FIG. 9 and data to be printed on A4-sized paper, the device 11 locks the tray 1 for A4-sized paper and prints the data on A4-sized paper sheets supplied one by one from the tray 1 as shown in FIG. 4(H). If an interrupt request for execution of a job for copying data on A4-sized paper as shown in FIG. 4(I), the device 11 compares a total number of A4-sized paper sheets needed for the jobs A and B with the number of A4-sized paper sheets remaining in the tray 1 to find whether there remains the paper sheets enough to execute both jobs A and B. If the number of remaining paper sheets is more than the total number of paper sheets for both jobs, the device 11 accepts the interrupt and carries out the interrupting job B for copying data on A4-sized paper by using the A4-sized paper tray 1 as shown in FIG. 4(K) since the job A can be also completed later without occurrence of an error "no paper" as shown in FIG. 4(J).

If the number of A4-sized paper sheets remaining in the tray 1 (for A4-sized paper) is less than the total number of paper sheets needed by both jobs A and B, the device 11 follows the procedure of FIG. 2(C) or the procedure of FIG. 3(F).

In the third exemplified operation, the device 11 uses a detector for detecting the number of paper sheets remaining in each paper feeding tray, such sensor may be for example of the prior art type disclosed in Japanese Laid-open Patent Publication No. 6-344642.

The exemplified operation 3 of the device 11 is described below with reference to a flowchart of FIG. 7.

To begin processing of image data for the first job (job A), the multifunctional image processing device 11 analyzes the data for the job A to form an image to be printed (Step S31). On completion of forming the printable image, the device 11 locks a paper feeding tray for the job A so that paper feeding tray may not be pulled out from there (Step S32). Then, the device 11 starts printing process by feeding a paper sheet from the tray designated by the job A (Step S33). While the device 11 periodically checks whether an interrupt takes place (Step S34), it continues the printing job A (Step S35).

In this case, the job A is not interrupted but completed to produce all requested prints (Step S36). The device 11 unlocks the used tray (Step S37) and finishes the job A. The tray may be also unlocked, of course, in the event of an error or power supply failure, further description of which is omitted.

In the example 3, the paper feeding tray for the job may be locked (Step S32) by using, for example, a prior art locking device as disclosed in Japanese Laid-open Patent Publication No. 5-77938.

Figure 9:
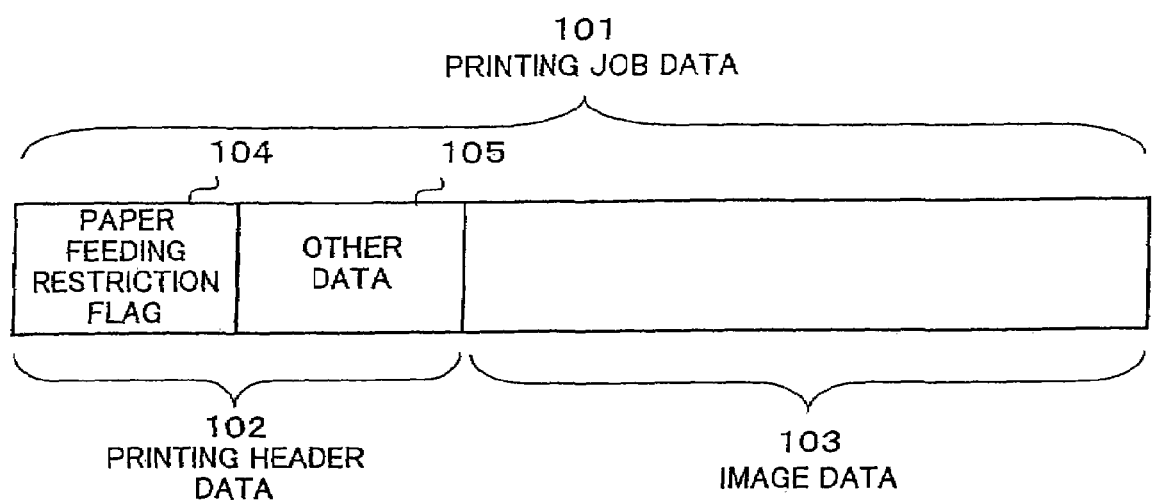
FIG. 9 shows a structure of data for a printing job.

If an interrupting job (job B) takes place in Step S34, the device 11 checks whether the tray is restricted to the current job A by a paper feeding restriction flag 104 for printing job data as shown in FIG. 9 (Step S38) and whether the tray requested by the job B corresponds to the tray used by the job A (Step S39).

If the tray is restricted, and if the same tray is designated by both jobs A and B, the number of paper sheets currently remaining in the tray used by the job A is determined and recorded as a variable $\alpha$ (Step S40).

The number of paper sheets needed for printing the remaining pages of the job A is recorded as a variable $\beta$ (Step S41) and image data for the job B is processed (Step S42) whereat the number of paper sheets to be printed by the job B is determined and recorded as a variable $\gamma$ (Step S43).

If the condition $\alpha \geq \beta + \gamma$ is not satisfied, the copying job B following the interrupt is started at a point (1) shown in the flowchart of in FIG. 5 or a point (2) shown in the flowchart of FIG. 6.

On the contrary, if any one of conditions "tray is not restricted to use for the current job" (Step S38), "the tray requested by the job B is different from the tray being used by the job A" (Step S39) and "$\alpha \geq \beta + \gamma$" (Step S44), the copying job B following the interrupt as shown in FIG. 8 is carried out (Step S45). On completion of the job B, the printing job A is resumed and completed (Step S35).

The paper feeding tray restriction flag 104 referred to above in the description of the exemplified operation 3 is now described in detail.

The printing job data 101 is composed of header data 102 and image data 103. The header data 102 includes a paper feeding restriction flag 104 together with other data 105.

When an interrupting job takes place in Step S34 of FIG. 7, it is needed to examine first whether the paper feeding tray restriction is set in Step S38. This is realized by recognizing that the paper feeding restriction flag 104 is set in the header data 102 of the printing job data 101.

As apparent from the foregoing, the present invention offers the following advantageous effects:

According to an aspect of the present invention, a current job to be interrupted can still have priority to use a designated paper feeding tray.

According to another aspect of the present invention, a current job may be protected against the occurrence of an error signal "no printing paper" resulting from the execution of an interrupting job.

According to another aspect of the present invention, an interrupting job can have a chance of selecting a paper feeding tray to be used.

According to another aspect of the present invention, it is possible to correctly judge that, if an interrupting job is executed by suspending a current job, an error signal "no paper" will occur during the execution of the remainder of the current job resumed after the end of the interrupting job.

In this case, it is also possible to give the interrupting job a chance of selecting another tray to be used.

According to another aspect of the present invention, it is possible to surely prohibit the selection of a tray being used by a current job when giving an interrupting job a chance of selecting one of available trays.

According to a further aspect of the present invention, it is possible to surely prevent a tray designated by a current job from feeding paper sheet from there even in the case when an interrupting job is executed by using another paper feeding tray.

According to a still further aspect of the present invention, it is possible for a user to change how to use the image forming system depending upon the user's circumferences.

The invention claimed is:

1. An image forming device having a function for suspending a current job and executing an interrupting job, comprising:
   a plurality of paper feeding trays; and
   a judging portion for deciding whether the interrupting job can be permitted to use a designated paper feeding tray selected by the interrupting job in case the designated paper feeding tray corresponds to a tray used by the current job;
   wherein the judging portion does not permit the interrupting job to print data on paper when a paper feeding tray selected by the interrupting job corresponds to a tray selected by the current job but permits the interrupting job to print data on paper when the paper feeding tray selected by the interrupting job is different from the paper feeding tray selected by the current job.

2. An image forming device as defined in claim 1, wherein the judging portion instructs the interrupting job to select a different paper feeding tray if a paper feeding tray selected by the interrupting job corresponds to a paper feeding tray selected by the current job and permits the interrupting job to print data on paper when the interrupting job selects a paper feeding tray different from the tray selected by the current job.

3. An image forming device as defined in claim 1, wherein each paper feeding tray is provided with a detector for detecting a number of remaining paper sheets therein, and the judging portion calculates a total number of paper sheets needed by the current job and the interrupting job and permits the interrupting job to be executed when the total number of paper sheets is less than a number of paper sheets remaining in the designated paper feeding tray and does not permit the interrupting job to be executed when the total number of paper sheets is more than the number of paper sheets remaining in the designated paper feeding tray.

4. An image forming device as defined in claim 1, wherein each paper feeding tray is provided with a detector for detecting a number of remaining paper sheets therein, and the judging portion calculates a total number of paper sheets needed by the current job and the interrupting job and permits the interrupting job to be executed when the total number of paper sheets is less than a number of paper sheets remaining in the designated paper feeding tray or instructs the interrupting job to select a different paper feeding tray when the total number of paper sheets is more than the number of paper sheet remaining in the designated paper feeding tray and permits the interrupting job to be executed when the interrupting job selects a different paper feeding tray.

5. A image forming device as defined in claim 2 or 4, wherein the judging portion prohibits the use of the paper feeding tray selected by the current job while performing the interrupting job.

6. An image forming device as defined in claim 1, wherein each paper feeding tray is provided with a locking means and the paper feeding tray selected by the current job is locked so that said paper feeding, tray cannot be pulled from the image forming device.

7. An image forming device as defined in claim 1, wherein functions of the judging portion are selectively used.

* * * * *